(12) United States Patent
Mizuochi et al.

(10) Patent No.: US 10,777,023 B2
(45) Date of Patent: Sep. 15, 2020

(54) WORKER MANAGEMENT SYSTEM

(71) Applicant: HITACHI CONSTRUCTION MACHINERY CO., LTD., Tokyo (JP)

(72) Inventors: Mariko Mizuochi, Tokyo (JP); Hiroshi Sakamoto, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/647,749

(22) PCT Filed: Mar. 7, 2019

(86) PCT No.: PCT/JP2019/009124
§ 371 (c)(1),
(2) Date: Mar. 16, 2020

(87) PCT Pub. No.: WO2019/181540
PCT Pub. Date: Sep. 26, 2019

(65) Prior Publication Data
US 2020/0226849 A1    Jul. 16, 2020

(30) Foreign Application Priority Data

Mar. 22, 2018  (JP) ................................ 2018-054297

(51) Int. Cl.
*G07C 3/06* (2006.01)
*E02F 9/24* (2006.01)
(Continued)

(52) U.S. Cl.
CPC .............. *G07C 3/06* (2013.01); *E02F 9/2045* (2013.01); *E02F 9/24* (2013.01); *E02F 9/261* (2013.01);
(Continued)

(58) Field of Classification Search
CPC .... G07C 3/06; E02F 9/24; E02F 9/261; E02F 9/2045; G01S 19/14; G01S 19/48; G06K 9/00805; G06Q 10/1091
See application file for complete search history.

(56) References Cited

U.S. PATENT DOCUMENTS 6,516,917 B1 *  2/2003  Mayer ..................... B66C 23/80
                                                          182/17
9,020,848 B1 *  4/2015  Ridge ...................... G07C 1/10
                                                          705/32
(Continued)

FOREIGN PATENT DOCUMENTS

JP      11160068 A       6/1999
JP    2007085091 A       4/2007
(Continued)

OTHER PUBLICATIONS

International Search Report of PCT/JP2019/009124 dated May 28, 2019.

*Primary Examiner* — Mohamed Barakat
(74) *Attorney, Agent, or Firm* — Mattingly & Malur, PC

(57) ABSTRACT

In a worker management system comprising a terminal device, a worker detection system, and a site management device, the terminal device transmits a worker signal, which includes terminal GNSS positional information represented by a GNSS coordinate system of the terminal device, to the site management device. The worker detection system transmits worker detected positional information, which indicates a position of the worker detected by a surrounding monitoring sensor mounted on the work machine, to the site management device. The site management device relates the terminal GNSS positional information to the worker detected positional information, and when both information for the same worker is available, it selects a position indicated by the worker detected positional information, and (Continued)

when only the terminal GNSS positional information is available, it selects a position indicated by the terminal GNSS positional information, as a current position of the worker.

6 Claims, 16 Drawing Sheets

(51) Int. Cl.
- *E02F 9/26* (2006.01)
- *G01S 19/14* (2010.01)
- *G01S 19/48* (2010.01)
- *G06K 9/00* (2006.01)
- *G06Q 10/10* (2012.01)
- *E02F 9/20* (2006.01)

(52) U.S. Cl.
CPC .............. *G01S 19/14* (2013.01); *G01S 19/48* (2013.01); *G06K 9/00805* (2013.01); *G06Q 10/1091* (2013.01)

(56) References Cited

U.S. PATENT DOCUMENTS

| | | | |
|---|---|---|---|
| 10,077,171 B2* | 9/2018 | Chustz | B66C 23/78 |
| 2010/0104199 A1* | 4/2010 | Zhang | G08G 1/165 |
| | | | 382/199 |
| 2012/0095651 A1* | 4/2012 | Anderson | G05D 1/028 |
| | | | 701/50 |
| 2017/0031367 A1* | 2/2017 | Tojima | G01S 13/931 |
| 2017/0248439 A1* | 8/2017 | Sakai | G05D 1/024 |

FOREIGN PATENT DOCUMENTS

| | | |
|---|---|---|
| JP | 2008101416 A | 5/2008 |
| JP | 2008179940 A | 8/2008 |
| JP | 2008248613 A | 10/2008 |
| JP | 2011028729 A | 2/2011 |

* cited by examiner

FIG. 14

WORKER POSITION
RECEPTION INFORMATION 350

| WORKER ID | UPDATE FREQUENCY | POSITIONAL INFORMATION | |
|---|---|---|---|
| | | POSITION CALCULATED VALUE | TERMINAL GNSS POSITIONING QUALITY |
| A | 100 | Xa,Ya,Za | LEVEL 1 |
| B | 78 | N/A | POSITIONING IS DISABLED |
| ⋮ | ⋮ | ⋮ | ⋮ |

FIG. 15

WORK MACHINE STATE
RECEPTION INFORMATION 360

| VEHICLE BODY ID | UPDATE FREQUENCY | POSITIONAL INFORMATION | | VEHICLE BODY WORK INFORMATION | | DETECTION INFORMATION |
| --- | --- | --- | --- | --- | --- | --- |
| | | POSITION CALCULATED VALUE | VEHICLE BODY GNSS POSITIONING QUALITY | WORK RANGE | WORK STATE | DETECTION AREA |
| C1 | 80 | X_C1,Y_C1,Z_C1 | LEVEL 2 | R_C1 | OPERATED STATE | x1,y1,z1 |
| C2 | 100 | X_C2,Y_C2,Z_C2 | LEVEL 1 | R_C2 | OPERATION STANDBY STATE | x2,y2,z2 |
| ... | ... | ... | ... | ... | ... | ... |

FIG. 16

WORKER DETECTED POSITIONAL INFORMATION 370

| No. | DETECTED POSITION | DETECTED VEHICLE BODY ID |
|---|---|---|
| 1 | X1,Y1,Z1 | C1 |
| 2 | X2,Y2,Z2 | C2 |
| 3 | X3,Y3,Z3 | C3 |
| ⋮ | ⋮ | ⋮ |

FIG. 17

WORKER POSITIONAL INFORMATION 380

| WORKER ID | POSITION CALCULATED VALUE | UPDATE FREQUENCY | ACCURACY |
|---|---|---|---|
| A | X1,Y1,Z1 | 100 | A |
| B | N/A | 0 | E |
| C | Xa,Ya,Za | 84 | B |
| UNKNOWN | X2,Y2,Z2 | 100 | B |
| ⋮ | ⋮ | ⋮ | ⋮ |

WORKER MANAGEMENT SYSTEM

TECHNICAL FIELD

The present invention relates to a worker management system, more particularly, to a system for monitoring a position of a worker within a worksite.

BACKGROUND ART

In a construction worksite, a plurality of work machines and workers are arranged in accordance with the contents of construction, and the work machines and the workers perform work while moving therein. In order to improve the safety and perform smooth construction management at the worksite, it is important to constantly monitor and grasp the positions of the work machines and the workers.

Accordingly, in Patent Literature 1, it is disclosed "each GPS positioning device is attached to such as a heavy machine and a worker in a monitoring area, and a transmitter transmits an individual mobile object position signal, which includes positions received from the positioning devices and identification signals of the mobile objects, to a management room. A receiver in the management room receives the individual mobile object position signal, and an allocation means allocates predetermined approach detection areas around the positions of the received mobile objects. An intersection detection means detects an intersection between the approach detection areas of the mobile objects, and outputs an intersection detection signal and the mobile objects related to the intersection at the time of the intersection detection. A notification device provided in the management room transmits an intersection notification signal, which includes the intersection detection signal and identification signals of the mobile objects relating to the intersection, and intersection receiving devices attached to each mobile object detects the intersection notification signal including the identification signal of each mobile object (extracted from Abstract)".

Furthermore, in Patent Literature 2, it is disclosed "a surrounding monitoring device for a work machine, comprises: a work machine posture capturing means for capturing the posture and the shape of the work machine at the time of performing work; a camera for taking images of the surrounding of the work machine; an obstacle detecting means for measuring the obstacle around the work machine and its position; a display image generating means for composing an image in which the posture, the shape, and a work range of the work machine are drawn based on information from the work machine posture capturing means, an image of the surrounding of the work machine which is taken by the camera, and an image in which the obstacle detected by the obstacle detecting means is drawn so as to generate a display image; and a display means for displaying the generated image (extracted from Abstract).

Still further, in Patent Literature 3, it is disclosed "a work machine (hydraulic excavator) comprises a camera; a GPS receiver; a wireless transceiver for receiving positional information measured by a GPS receiver provided in another work machine and a GPS receiver carried by a worker; an warning sound generating device for notifying a driver that another work machine or another worker has entered a monitoring range; a display device for displaying a camera image; and a monitoring controller. A safety management device is configured by the work machine configured as above, an intrusion information management computer provided outside the work machine such as in a management office, an information terminal for transferring intrusion information collected by the work machine to the intrusion information management computer, a GPS receiver carried by the worker, and a wireless transceiver (extracted from Abstract)".

CITATION LIST

Patent Literature

Patent Literature 1: JP-H11-160068 A
Patent Literature 2: JP-2008-248613 A
Patent Literature 3: JP-2007-85091 A

SUMMARY OF INVENTION

Solution to Problem

A Global Navigation Satellite System (GNSS) is a system for positioning a three-dimensional position (latitude, longitude, altitude) of an object based on signals transmitted from a plurality of satellites. The calculation of the three-dimensional position requires signals obtained simultaneously from at least four positioning satellites. Accordingly, when the signals from the four satellites cannot be obtained due to the reasons that the sky is not clear when the position detection is performed, the radio wave environment is not good, etc., the three-dimensional position cannot be obtained.

Since the limitation in weight and size of a GNSS device mounted in a work machine is relatively small, a large sized GNSS device can be used, whereby the reception sensitivity of radio waves from the positioning satellites is relatively good. On the other hand, since a GNSS device carried by a worker is required not only to be small in size and weight because of the necessity of securing portability, but also to be formed inexpensively. Accordingly, the reception sensitivity of the GNSS device carried by a worker is lower than that of the GNSS device mounted in the work machine, and the possibility that the GNSS device carried by a worker is influenced by the satellite arrangement and the surrounding environment becomes high.

In addition, the positioning accuracy by a GNSS is affected by the satellite arrangement on the sky, propagation delay due to radio wave characteristics on a radio wave propagation path from positioning satellites, and/or reflections of the radio waves due to buildings, walls, etc. As a result, a large error may occur in the three-dimensional position calculated values. Particularly, since the positioning accuracy is affected near a large sized work machine due to the shielding on the sky and/or the reflections of the radio waves, it is concerned that the positioning accuracy of the GNSS device carried by a worker may be decreased. Accordingly, in order to monitor the positions of workers by using the techniques of Patent Literature 1 and Patent Literature 3, it is necessary to address a situation where the positioning accuracy of a GNSS is poor.

On the other hand, in Patent Literature 2, it is possible to grasp the position of a worker (obstacle) around the work machine without being affected by the positioning accuracy of a GNSS, however, it is not possible to monitor the entire worksite. Accordingly, it is necessary to monitor the position of a worker without being limited to the surrounding of the work machine and even when the positioning accuracy of the GNSS is poor.

The present invention has been made in view of the problems described above, and an objective of the present invention is to provide a worker management system for a worksite in which positions of workers in an entire worksite can be accurately managed while addressing a situation where the positioning accuracy of a GNSS is poor.

Solution to Problem

The present invention provides a worker management system comprising: a terminal device carried by a worker; a worker detection system mounted on a work machine; and a site management device connected to each of the terminal device and the worker detection system via a wireless communication network, wherein the terminal device includes: a terminal GNSS device configured to receive a GNSS positioning signal to generate terminal GNSS positional information; and a terminal wireless communication device connected to the wireless communication network, the terminal device is configured to transmit a worker signal, which includes the terminal GNSS positional information and worker identification information for identifying the worker, to the site management device via the terminal wireless communication device, the worker detection system includes: a vehicle body GNSS device configured to receive a GNSS positioning signal to generate vehicle body GNSS positional information; a surrounding monitoring sensor configured to detect an object located near the work machine; a vehicle body wireless communication device connected to the wireless communication network; and a vehicle body control device connected to each of the vehicle body GNSS device, the surrounding monitoring sensor, and the vehicle body wireless communication device, the vehicle body control device is configured to generate a vehicle body signal which includes the vehicle body GNSS positional information, worker detected positional information indicating a position of the worker detected by the surroundings monitoring sensor, and a work machine identification signal for identifying the work machine, and transmit the vehicle body signal via the vehicle body wireless communication device to the site management device, the site management device includes: a site management communication device connected to the wireless communication network; a display device; and a site management control device connected to each of the site management communication device and the display device, the site management control device is configured to acquire the worker signal and the vehicle body signal which are received by the site management communication device, calculate a current position of the worker by using the terminal GNSS positional information included in the worker signal and the worker detected positional information included in the vehicle body signal, and generate and output a display command to the display device, and the display device is configured to perform display in accordance with the display command.

Advantageous Effects of Invention

According to the present invention, it is possible to provide a worker management system for a worksite in which positions of workers in an entire worksite can be accurately managed while addressing a situation where the positioning accuracy of a GNSS is poor. The problems, configurations, and effects other than those described above will be clarified by explanation of the embodiments below.

BRIEF DESCRIPTION OF DRAWINGS

FIG. 14 illustrates a data structure of worker position reception information according to the present embodiment.

FIG. 15 illustrates a data structure of work machine state reception information according to the present embodiment.

FIG. 16 illustrates a data structure of worker detected positional information according to the present embodiment.

FIG. 17 illustrates a data structure of worker positional information according to the present embodiment.

DESCRIPTION OF EMBODIMENTS

Hereinafter, an embodiment of a worker management system 200 according to the present invention will be described with reference to the drawings.
<Overview and Overall Structure>

Figure 1:
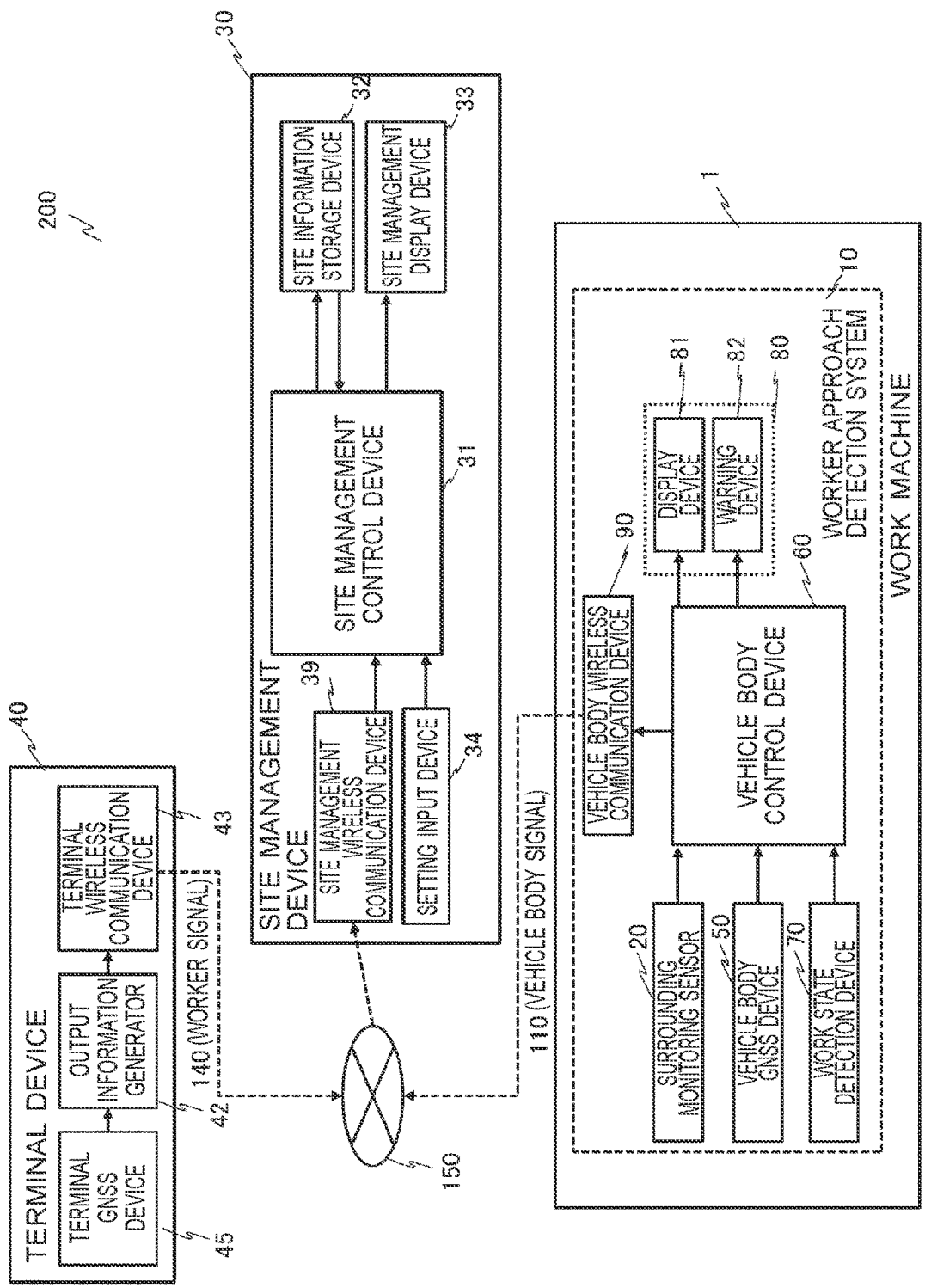
FIG. 1 is a schematic configuration diagram of a worker management system according to the present embodiment.

FIG. 1 is a schematic configuration diagram of the worker management system 200 according to the present embodiment. In a construction worksite where a construction work is performed, in accordance with required work, at least one work machine 1 and a plurality of workers are arranged in the worksite, and the work machine 1 and the workers perform the work while moving in the worksite. At the construction worksite, a supervisor (work supervisor) are assigned to manage a construction plan, construction quality, progress, and safety measures.

The worker management system 200 according to the present embodiment uses a terminal device 40 carried by a worker and a worker approach detection system 10 mounted on the work machine 1 (corresponding to a worker detection system) to accurately calculate positions of the work machine 1 and the worker moving in the worksite, record the positions of the work machine 1 and the worker in the worksite, and present the positions of the work machine 1 and the worker in the worksite in response to request from the supervisor, etc.

In the worker management system 200, each of the terminal device 40 and the worker approach detection system 10 is connected to a site management device 30 installed in the worksite via a wireless communication network 150 such as a LAN or a cellular phone network in the site.

The terminal device 40 includes a terminal GNSS device 45, an output information generator 42, and a terminal wireless communication device 43, and is configured to transmit a worker signal 140 to the site management device 30. The worker signal 140 includes terminal positioning quality indicating the reliability of a terminal current position, which is represented by a GNSS coordinate system detected by the terminal GNSS device 45, and a GNSS positioning signal used for detecting the terminal current position (collectively referred to as "terminal GNSS positional information"). The worker signal 140 also includes worker identification information (hereinafter referred to as "worker ID") which is specific to identify a worker.

Since the output information generator 42 stores the worker ID in advance and generates the worker signal 140, it has functions as a worker identification information storage section and a worker signal generation section.

The worker approach detection system 10 includes a vehicle body GNSS device 50, a surrounding monitoring sensor 20, a work state detection device 70, a notification device 80, and a vehicle body wireless communication device 90, and a vehicle body control device 60 connected to these devices and sensors, respectively. In the present embodiment, a display device 81 and a warning device 82 are used as the notification device 80.

The vehicle body control device 60 is configured to output a vehicle body signal 110. The vehicle body signal 110 includes vehicle body positioning quality indicating the reliability of a vehicle body current position, which is represented by the GNSS coordinate system detected by the vehicle body GNSS device 50, and a GNSS positioning signal used for detecting the vehicle body current position (collectively referred to as "vehicle body GNSS positional information"). The vehicle body signal 110 also includes vehicle body identification information (hereinafter referred to as "vehicle body ID", which corresponds to "work machine identification information") which is specific to identify the work machine 1.

The site management device 30 includes a site management wireless communication device 39 (corresponding to a site management communication device) to be connected to the wireless communication network 150, a setting input device 34 formed by a user interface device and configured to accept operation for setting a specific area within a worksite, a site information storage device 32 formed by a storage, a site management display device 33 formed by a monitor for displaying a result of the calculation in response to a command from a supervisor, etc., and a site management control device 31 formed by a computer connected to these devices and configured to calculate the positions of the work machine 1 and a worker based on the worker signal 140 and the vehicle body signal 110. The setting input device 34 is an input device used by a work supervisor, etc. to designate information to be output to the site management display device 33. For example, the setting input device 34 is assumed to be used for setting an area to be displayed on the site management display device 33, setting to display only information of a specific worker, and setting to display information at a specific time.

The surrounding monitoring sensor 20 is configured to include a sensor capable of detecting a worker near the work machine 1, such as an infrared sensor, a stereo camera, a millimeter wave radar, a LiDAR (light detection and ranging), and a RFID (radio frequency identifier). In the present embodiment, a case where a stereo camera is mounted on the work machine 1 as the surrounding monitoring sensor 20 is described as an example.

Figure 2:
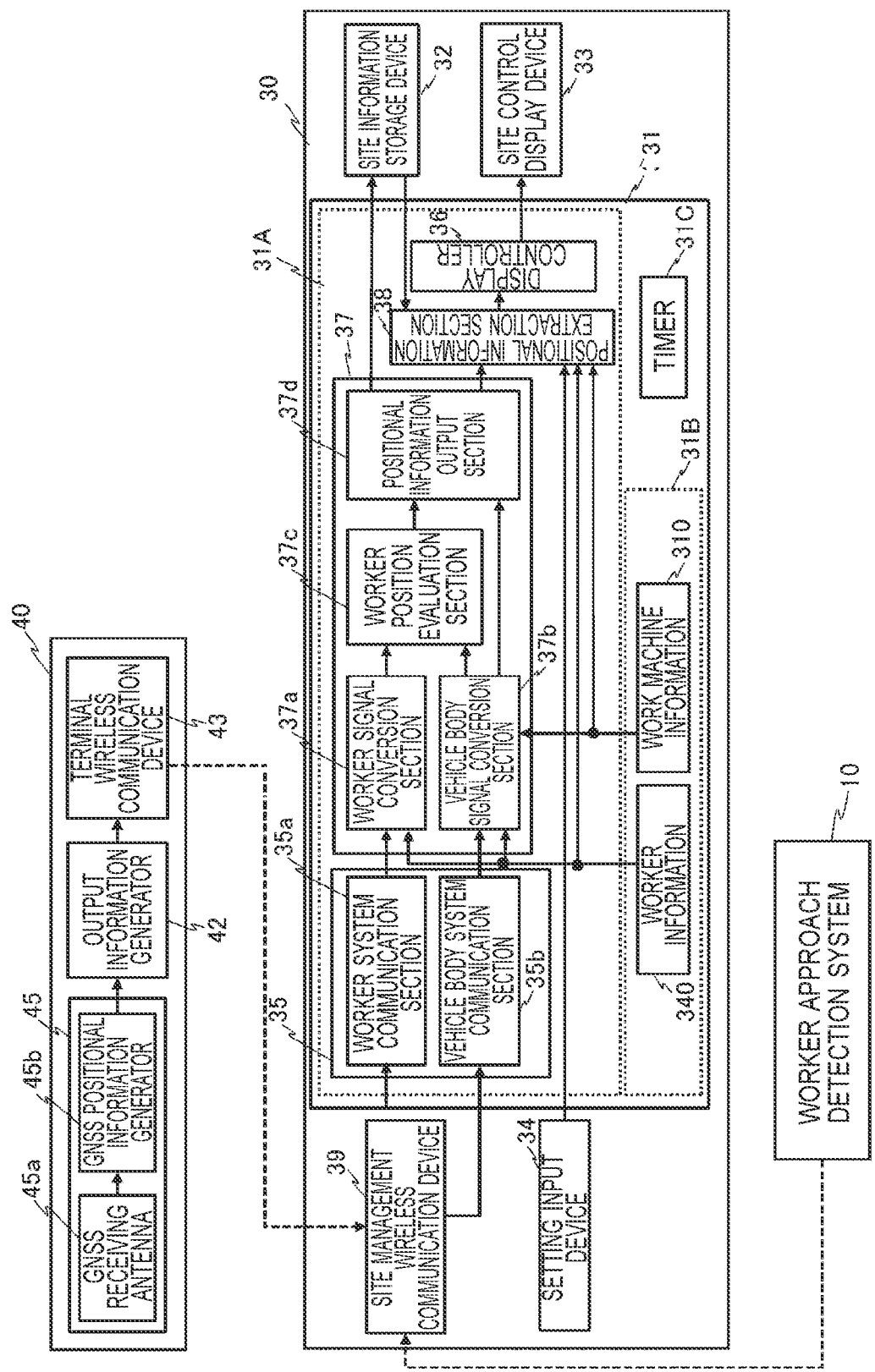
FIG. 2 is a schematic configuration diagram of a terminal device and a site management control device according to the present embodiment.
Figure 3:
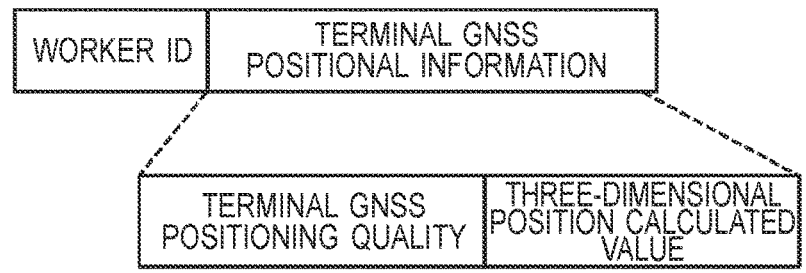
FIG. 3 illustrates a data structure of a worker signal according to the present embodiment.
Figure 4:
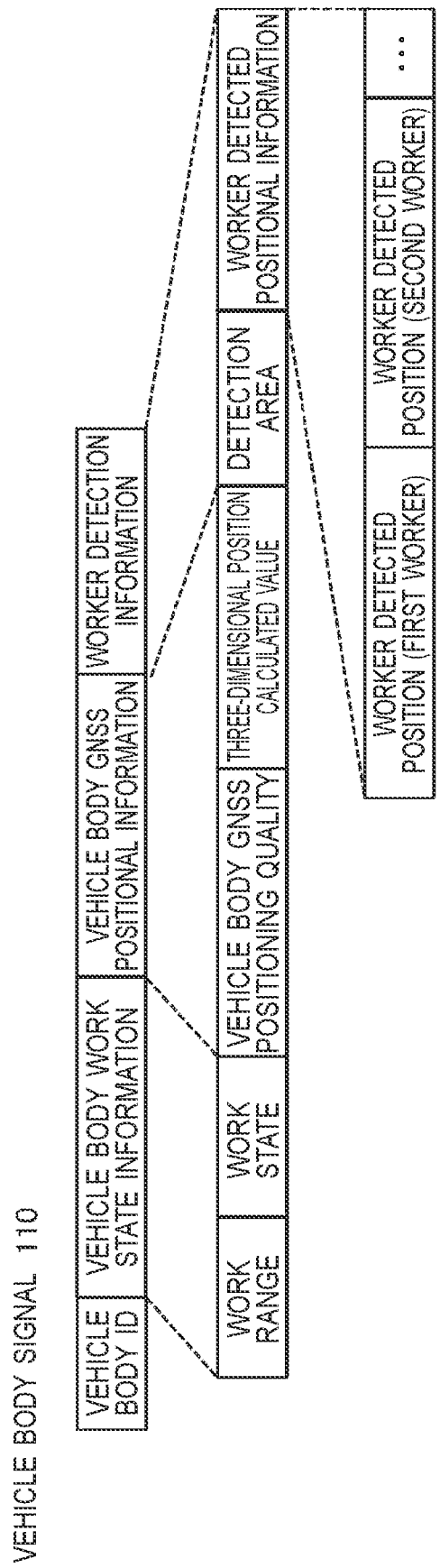
FIG. 4 illustrates a data structure of a vehicle body signal according to the present embodiment.

FIG. 2 is a schematic configuration diagram of the terminal device 40 and the site management control device 31 according to the present embodiment. FIG. 3 illustrates a data structure of the worker signal 140 according to the present embodiment. FIG. 4 illustrates a data structure of the vehicle body signal 110 according to the present embodiment.

The terminal device 40 is carried by a worker, and prepared for the number of workers placed at the worksite.

The terminal GNSS device 45 includes a GNSS receiving antenna 45a configured to receive radio waves from positioning satellites, and a GNSS positional information generator 45b configured to demodulate the received radio waves and calculate a three-dimensional position of the terminal device 40 based on signals from a plurality of positioning satellites. The terminal GNSS device 45 is configured to output, to the output information generator 42, a calculated three-dimensional position calculated value and GNSS positioning quality information serving as a criterion of the accuracy and the reliability of the three-dimensional position calculated value, as positional information.

As the GNSS positioning quality information, for example, the number of and the arrangement of satellites used for the calculation, positioning states such as Fix, Float, and single positioning, and position calculation error estimated values in the latitudinal direction and the longitudinal direction are output. When the terminal GNSS device 45 cannot receive signals required for calculation of the three-dimensional position, the GNSS positioning quality information is set to "positioning is disabled" and the three-dimensional position calculated value is set to "N/A (calculation is disabled)" to generate the positional information.

The output information generator 42 is configured to generate the worker signal 140 illustrated in FIG. 3. The worker signal 140 includes the worker ID and the terminal GNSS positional information represented by the GNSS coordinate system detected by the terminal GNSS section 45.

The terminal wireless communication device 43 is configured to transmit the worker signal 140 to the site management device 30 via the wireless communication network 150.

The worker approach detection system 10 is configured to generate and transmit the vehicle body signal 110 to the site management device 30 via the wireless communication network 150.

As illustrated in FIG. 4, the vehicle body signal 110 is a signal including the vehicle body ID, vehicle body work state information (corresponding to work machine state information), a vehicle body current position, and worker detection information. The vehicle body ID is an ID which is specific to identify the work machine 1. The vehicle body work state information represents a state of the work machine 1, and in the present embodiment, a work range and a work state output from the vehicle body state calculation section 61 (see FIG. 10) are stored as the vehicle body work state information.

The vehicle body GNSS positional information includes the vehicle body GNSS positioning quality and the three-dimensional position calculated value. The worker detection information includes a detection area 220 and worker detected positional information 370. When a plurality of workers is detected, the worker detected positional information 370 includes the worker detected positional information 370 represented by a sensor coordinate system for all the detected workers.

Details of the site management control device 31 will be described later.

Figure 5:
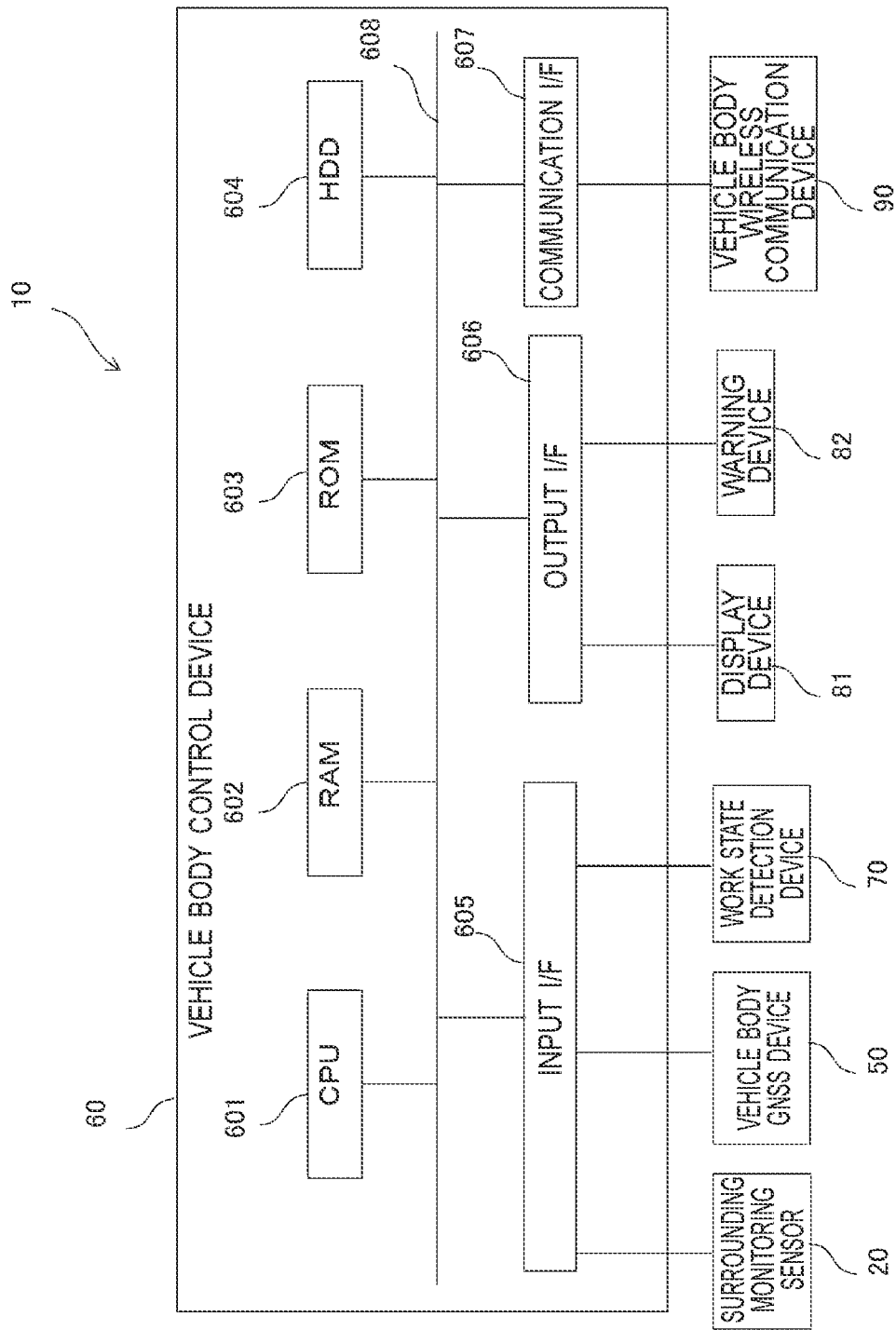
FIG. 5 is a hardware configuration diagram of a worker approach detection system.

FIG. 5 is a hardware configuration diagram of the worker approach detection system 10. The vehicle body control device 60 included in the worker approach detection system 10 includes a CPU (Central Processing Unit) 601, a RAM (Random Access Memory) 602, a ROM (Read Only Memory) 603, an HDD (Hard Disk Drive) 604, an input I/F 605, an output I/F 606, and a communication I/F 607, which are connected to each other via a bus 608.

The input I/F 605 is connected respectively to the surrounding monitoring sensor 20, the vehicle body GNSS device 50, and the work state detection device 70, whereby data and signals from each member are input to the vehicle body control device 60.

The output I/F 606 is connected respectively to the display device 81 and the warning device 82 including a buzzer and a pilot lamp.

The communication I/F 607 is connected to the vehicle body wireless communication device 90 including a communication device capable of transmitting and receiving wireless communication data, such as a Wi-Fi device.

Figure 6:
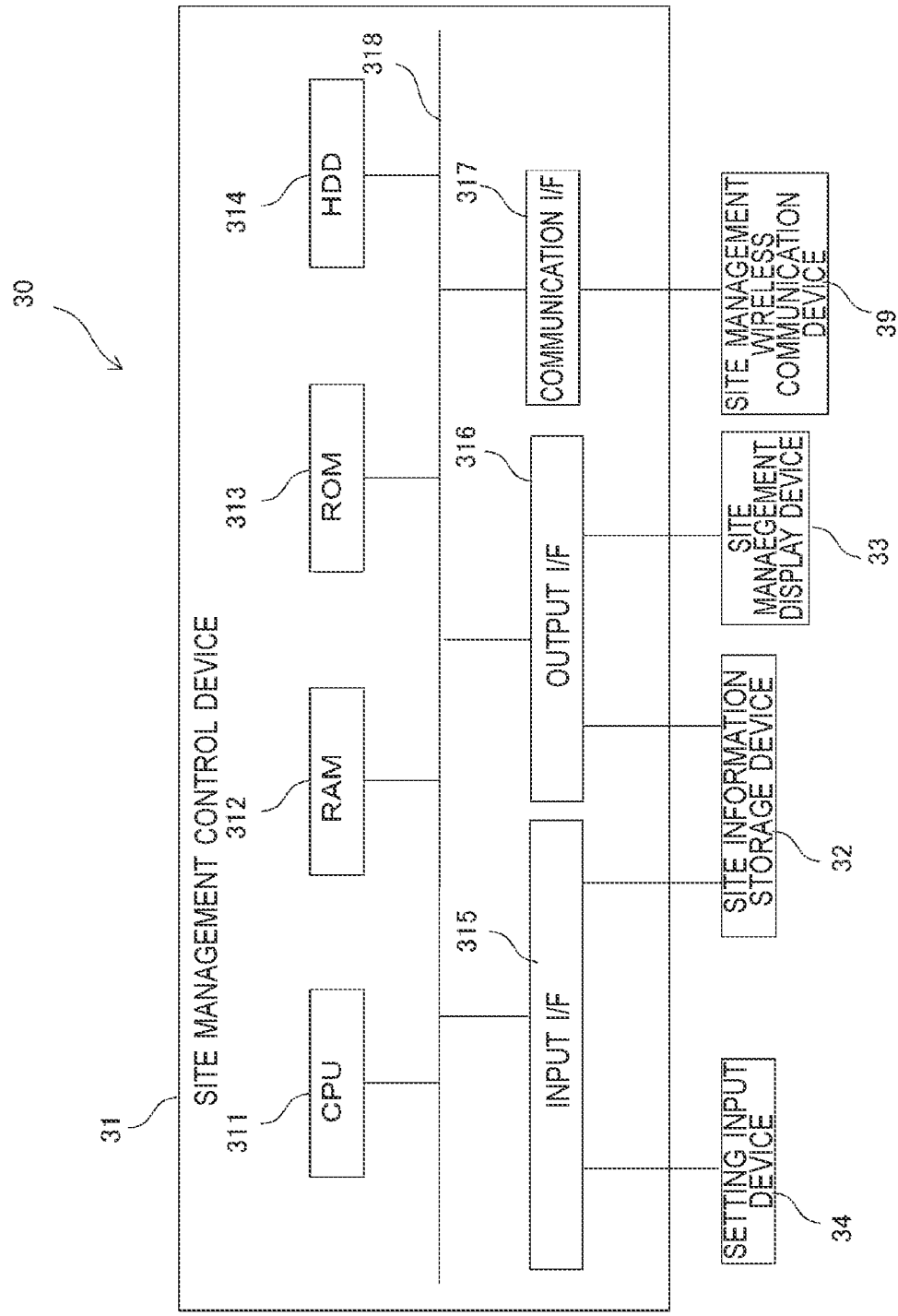
FIG. 6 is a hardware configuration diagram of a site management device.

FIG. 6 is a hardware configuration diagram of the site management device 30. The site management control device 31 included in the site management device 30 includes a CPU 311, a RAM 312, a ROM 313, an HDD 314, an input I/F 315, an output I/F 316, and a communication I/F 317, which are connected to each other via a bus 318.

The input I/F 315 is connected to the setting input device 34 including a keyboard, a touch panel, and a hard button, and a site information storage device 32 including a storage such as an HDD.

The output I/F 316 is connected to the site information storage device 32 and a site management display device 33. It has been described above that the site information storage device 32 is connected respectively to the input I/F 315 and the output I/F 316. However, connection of two systems is merely illustrated for convenience of explanation, and when a bidirectional communication I/F such as a USB (Universal Serial Bus) is used, one system may be applied as an actual connection line.

The communication I/F 317 is connected to the site management wireless communication device 39 including a communication device capable of transmitting and receiving wireless communication data, such as a Wi-Fi device. The site management control device 31 is configured to acquire a vehicle body signal and a worker signal received by the site management wireless communication device 39, and executes each processing using these signals.

Figure 7:
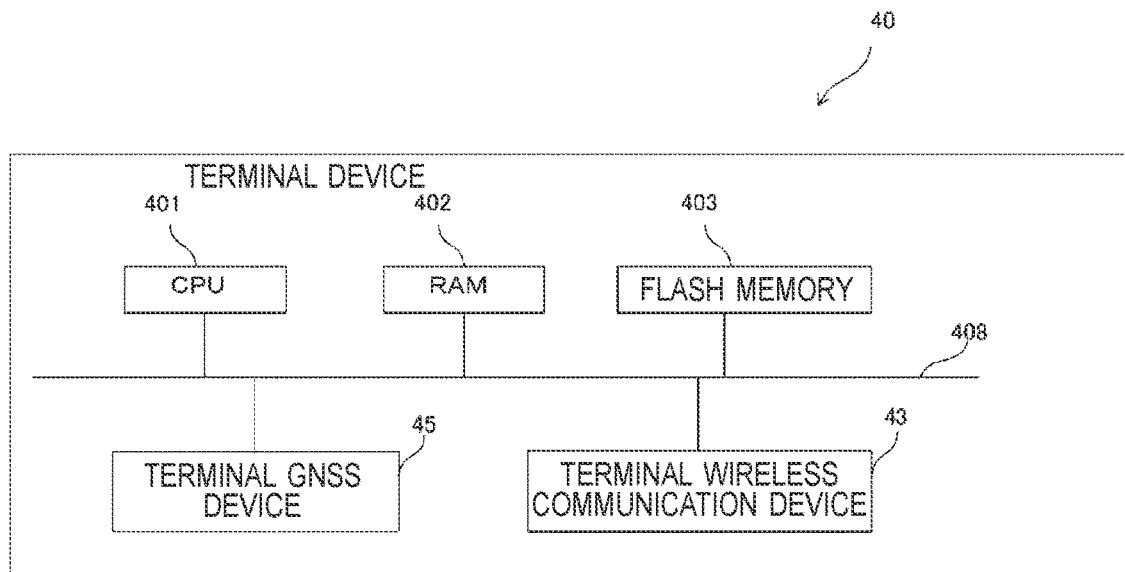
FIG. 7 is a hardware configuration diagram of a terminal device.

FIG. 7 is a hardware configuration diagram of the terminal device 40. The terminal device 40 includes a CPU 401, a RAM 402, a flash memory 403, the terminal GNSS device 45, and the terminal wireless communication device 43, which are connected to each other via a bus 408. The CPU 401, the RAM 402, the flash memory 403, and the bus 408 constitute a terminal control device. Furthermore, control software of the terminal wireless communication device 43 executed by the CPU 401 corresponds to a terminal communication controller. The terminal communication controller is configured to control transmission of the worker signal 140, which will be described later.

The hardware configuration of the vehicle body control device 60, the site management control device 31, and the terminal device 40 is not limited to the examples described above as long as it may be so-called a computer configured by combination of a control circuit and a storage device. The computer constituting each member executes software for realizing the functions of each member, thereby realizing the vehicle body control device 60, the site management control device 31, and the terminal device 40.

Figure 8:
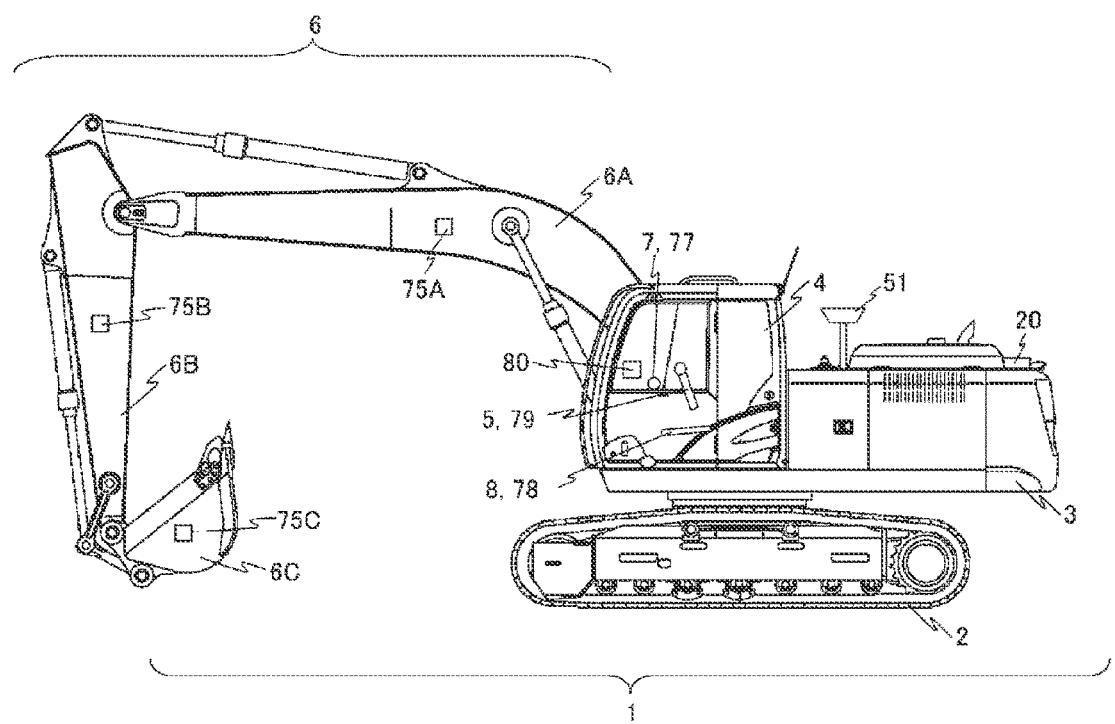
FIG. 8 is a side view of an example of a work machine according to the present embodiment.
Figure 9:
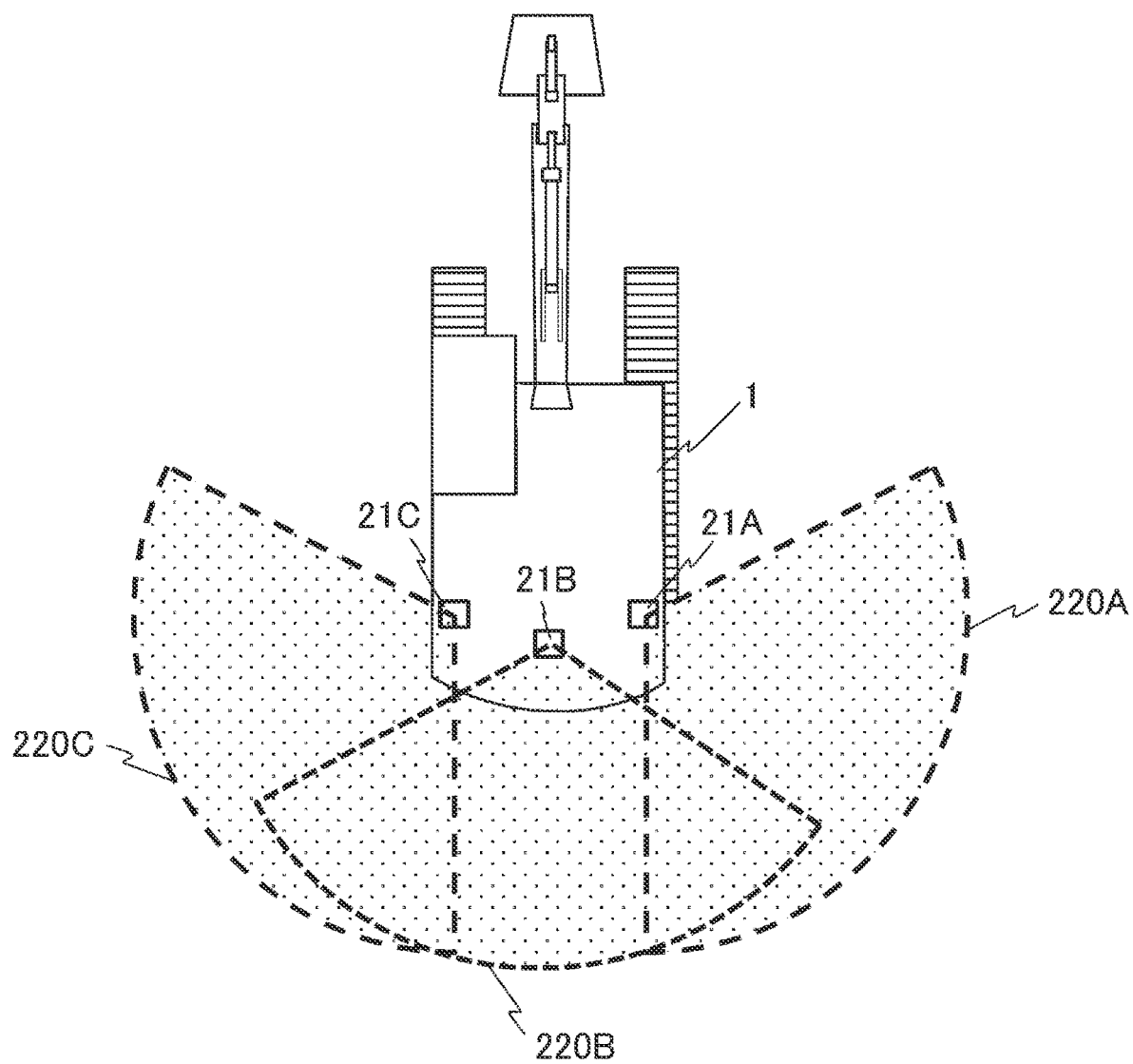
FIG. 9 illustrates an example of installation of a surrounding monitoring sensor according to the present embodiment.

With reference to FIGS. 8 and 9, the configuration of the work machine 1 and the detection area 220 will be described. FIG. 8 is a side view of an example of the work machine according to the present embodiment. FIG. 9 illustrates an example of installation of the surrounding monitoring sensor 20 according to the present embodiment.

As an example of the work machine 1, a medium sized hydraulic excavator is described in the present embodiment. The hydraulic excavator as the work machine 1 includes an undercarriage 2, an upperstructure 3 pivotably mounted on an upper portion of the undercarriage 2, and a front working device 6 configured by a multi-joint type link mechanism in which one end thereof is connected to the upperstructure 3. The front working device 6 includes a boom 6A of which one end is connected to the upperstructure 3, an arm 6B of which one end is connected to the other end of the boom 6A, and a bucket 6C of which one end is connected to the other end of the arm 6B, and these members are configured to be rotated vertically. An operator's cab 4 is provided on the upperstructure 3. On certain portions of the upperstructure 3, an engine serving as a power system, drive hydraulic circuits of drive actuators, etc. are mounted, and moreover, an operation control device 9 for controlling starting and stopping of the work machine 1 and the overall operation thereof is provided.

The operator's cab 4 is provided therein with an engine key switch 7 for starting the engine, an operation lever 5 for an operator to input a movement instruction to each drive actuator, a lock lever 8 for blocking the movement instruction, etc. are provided. When the operation lever 5 is operated in a state where the engine key switch 7 is turned "ON" and the lock lever 8 is set to "unlocked", traveling, pivoting, and various operations by using the front working device 6 are performed. In addition to the operation devices described above, the operator's cab 4 is further provided therein with the notification device 80 for notifying an operator of approaching of a worker.

The work machine 1 includes sensors, as the work state detection device 70, for detecting a work state of the work machine 1. In the present embodiment, detection of the work state is performed based on the posture of the front working device 6 and operation states of the engine, the operation lever 5, etc. In order to detect the posture and the operation states, the work state detection device 70 includes a posture sensor 71 (see FIG. 10) and a machine operation state sensor 72 (see FIG. 10).

The posture sensor 71 is configured to detect the posture of the work machine 1, and in the present embodiment, includes a boom posture sensor 75A, an arm posture sensor 75B, and a bucket posture sensor 75C respectively for each of the boom 6A, the arm 6B, and the bucket 6C that constitute the front working device 6.

The machine operation state sensor 72 is configured to detect operation states of the work machine 1, and in the present embodiment, includes a key state detection sensor 77 for detecting a state of the engine key switch 7, a lock state detection sensor 78 for detecting a state of the lock lever 8, and a lever operation amount sensor 79 for detecting an operation amount of the operation lever 5.

On the upperstructure 3, a GNSS receiving antenna 51 is installed. Since the GNSS receiving antenna 51 is installed at a position higher than the terminal device 40 carried by a worker moving on the ground surface, the receiving sensitivity of positioning signals become better than that of the terminal device 40.

Furthermore, on rear portions of the upperstructure 3, stereo cameras as the surrounding monitoring sensor 20 are installed. More specifically, as illustrated in FIG. 9, a first stereo camera 21A, a second stereo camera 21B, and a third stereo camera 21C are respectively mounted on the right rear side, the rear side, and the left rear side of the upperstructure 3, whereby images in each detection area of the first stereo camera 21A, the second stereo camera 21B, and the third stereo camera 21C, in other words, a first detection area 220A, a second detection area 220B, and a third detection area 220C are captured.

Figure 10:
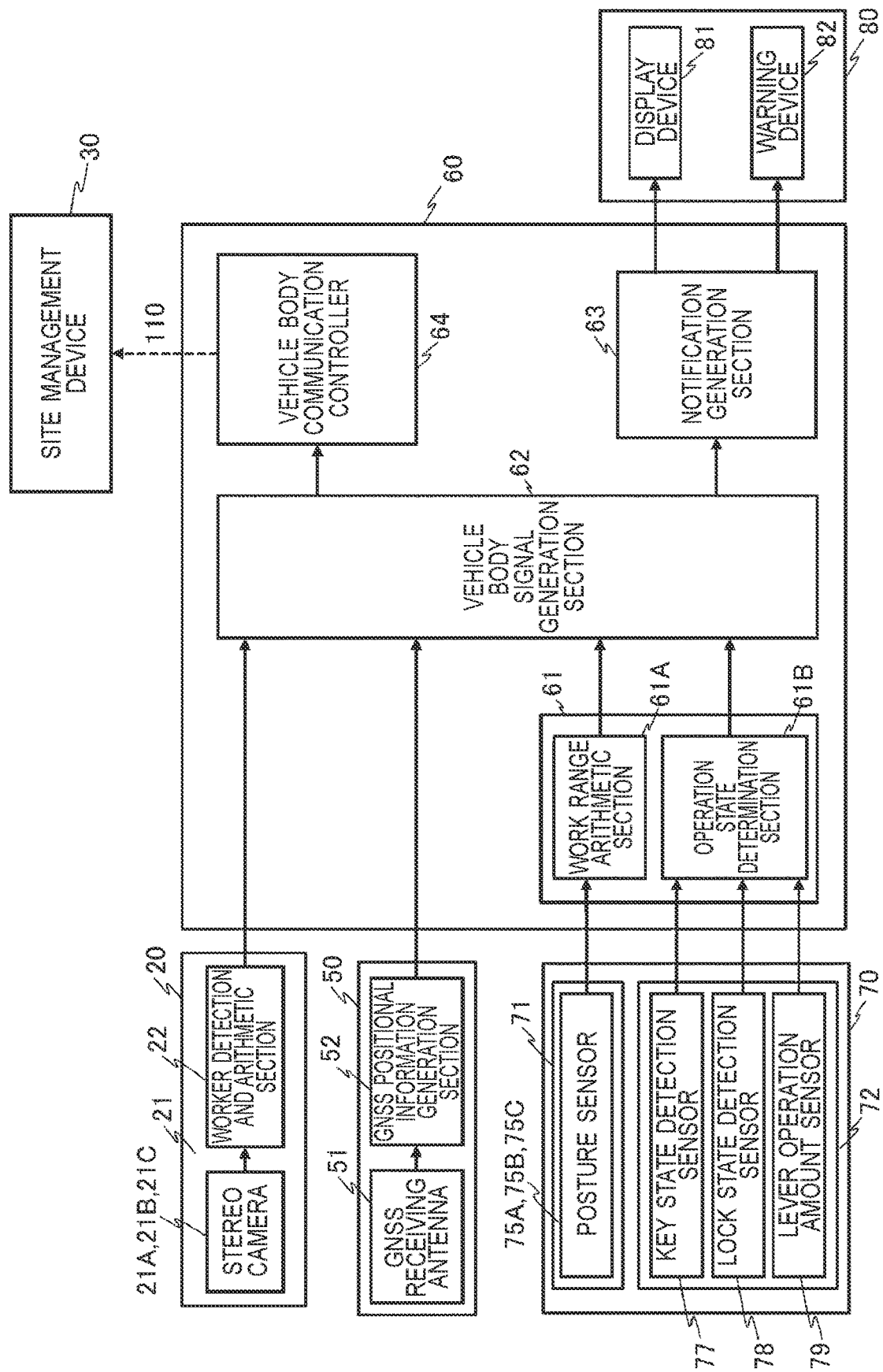
FIG. 10 is a schematic configuration diagram of a vehicle body control device of the present embodiment.

FIG. 10 is a schematic configuration diagram of the vehicle body control device 60. The vehicle body control device 60 includes a vehicle body state calculation section 61 configured to calculate a work state of the work machine 1 based on an output signal from the work state detection device 70, a vehicle body signal generation section 62 configured to generate the vehicle body signal 110 based on an output signal from the surrounding monitoring sensor 20, an output signal from the vehicle body GNSS device 50, and a calculation result from the vehicle body state calculation section 61, a vehicle body communication controller 64 configured to transmit the vehicle body signal 110 to the site management device 30, and a notification generation section 63 configured to generate a notification command to the notification device 80.

The surrounding monitoring sensor 20 includes a worker detection and arithmetic section 22 configured to acquire images from the first stereo camera 21A, the second stereo camera 21B, and the third stereo camera 21C and execute, for example, person extraction processing to detect a worker. Upon detecting a worker, the worker detection and arithmetic section 22 outputs, to the vehicle body signal generation section 62, the worker detected positional information 370 indicating a position of the worker represented by the sensor coordinate system in association with detection area information indicating each detection area 220 of each surrounding monitoring sensor 20 provided on each vehicle body.

The vehicle body state calculation section 61 is configured by functional blocks of a work range arithmetic section 61A and an operation state determination section 61B.

The work range arithmetic section 61A is configured to calculate, as a work range, the distance from the pivot center of the work machine 1 to the end of the front working device 6 by using output signals from the boom posture sensor 75A, the arm posture sensor 75B, and the bucket posture sensor 75C. Depending on the posture of the front working device 6, the distance from the pivot center to an end of the arm 6B closer to the boom 6A may be longer than the distance from the pivot center to a front end of the bucket 6C. Accordingly, the work range arithmetic section 61A defines a position farthest from the pivot center as an end of the front working device in accordance with the posture of the boom 6A, the arm 6B, and the bucket 6C. Furthermore, the work range arithmetic section 61A defines the distance from the pivot center to the end of the front working device as the work range, and calculates the work range by link calculation based on dimensional information of each part of the work machine 1 and input signals from the boom posture sensor 75A, the arm posture sensor 75B, and the bucket posture sensor 75C.

In the present embodiment, it has been described that a position farthest from the pivot center is defined as an end of the front working device. Meanwhile, when the calculated work range is smaller than the distance from the pivot center to the rear end of the upperstructure 3, the distance from the pivot center to the rear end of the upperstructure 3 may be output as the work range.

The operation state determination section 61B is configured to determine operation states by using output signals from the machine operation state sensor 72. In the present embodiment, the operation state determination section 61B determines an engine start state based on an input state from the key state detection sensor 77, a lock state by the lock lever 8 based on an input signal from the lock state detection sensor 78, and types of operation based on an input signal from the lever operation amount sensor 79. Even if the engine is in a start state, when the lock lever 8 is in a locked state, the work machine 1 does not work in response to any operation by the operation lever 5. Accordingly, the operation states are divided into four types of states, namely, "engine stop state", "operation locked state", "operation standby state" and "operated state".

In the following, a flow for determination of the operation states will be described. Firstly, when an input signal from the key state detection sensor 77 indicates a state other than an engine ON state, the operation state determination section 61B determines that the engine is in the "engine stop state". When the engine is in the ON state, the operation state determination section 61B performs determination as to a lock state based on an input signal from the lock state detection sensor 78. When the lock lever 8 is in the locked state, the operation state determination section 61B determines that the lock lever 8 is in the "operation locked state". When the lock lever 8 is in an unlocked state, the operation state determination section 61B performs determination as to an operation state of the operation lever 5 based on an input signal from the lever operation amount sensor 79. When neither operation is performed with respect to the operation lever 5, the operation state determination section 61B determines that the operation lever 5 is in the "operation standby state", while when either operation is performed with respect to the operation lever 5, the operation state determination section 61B determines that the operation lever 5 is in the "operated state".

The vehicle body signal generation section 62 is configured to generate the vehicle body signal 110 (see FIG. 4) based on the output signal from the surrounding monitoring sensor 20, the output signal from the vehicle body GNSS device 50, and the calculation result from the vehicle body state arithmetic section 61, and output the vehicle body signal 110 to the vehicle body communication controller 64. The vehicle body signal generation section 62 has a function as a vehicle body identification information storage section since it stores the vehicle body ID in advance.

The vehicle body communication controller 64 is configured to transmit the vehicle body signal 110 to the site management device 30 via the vehicle body wireless communication device 90.

The notification generation section 63 is configured to generate a display command to the display device 81 and a warning command to the warning device 82 by using the worker detection information and the vehicle body work state information output from the vehicle body signal generation section 62.

The notification device 80 is a device for notifying an operator of the work machine 1 of the presence of a worker around the work machine 1, and in the present embodiment, includes the display device 81 and the warning device 82.

The display device 81 is a device configured by a liquid crystal panel, etc., and provided in the operator's cab 4 of the work machine 1. The display device 81 is used to notify an operator of the work machine 1 of the presence of a worker by visual information, and displays a presence area 240 of the worker and/or the approach of the worker based on the display command from the vehicle body control device 60.

The warning device 82 is a device capable of generating sound, voice, etc., and provided in the operator's cab 4 of the work machine 1. The warning device 82 is used to notify an operator of the work machine 1 of the approach of a worker by auditory information, and generates warning sound, etc. for notifying the approach of the worker based on the warning command from the vehicle body control device 60.

The display command and the warning command are changed depending on whether a worker is present within a predetermined approach notification area. For example, the vehicle body control device 60 outputs a command to the display device 81 to draw the detection area 220 and a position of the worker on a top view of the work machine 1. When the worker is present in the approach notification area, the vehicle body control device 60 makes the display device 81 display the notification of the approach of the worker. In addition, a display of the work range, the approach notification area, etc. may be added thereto.

The command to the warning device 82 is determined by whether a worker is present in the approach notification area. When the worker is present in the approach notification area, the vehicle body control device 60 issues a warning command, and when the worker is not present therein, the vehicle body control device 60 does not issue the warning command. In addition, the types of warning may be provided in several stages in accordance with information such as the number of detected workers, the distance, etc.

Figure 11:
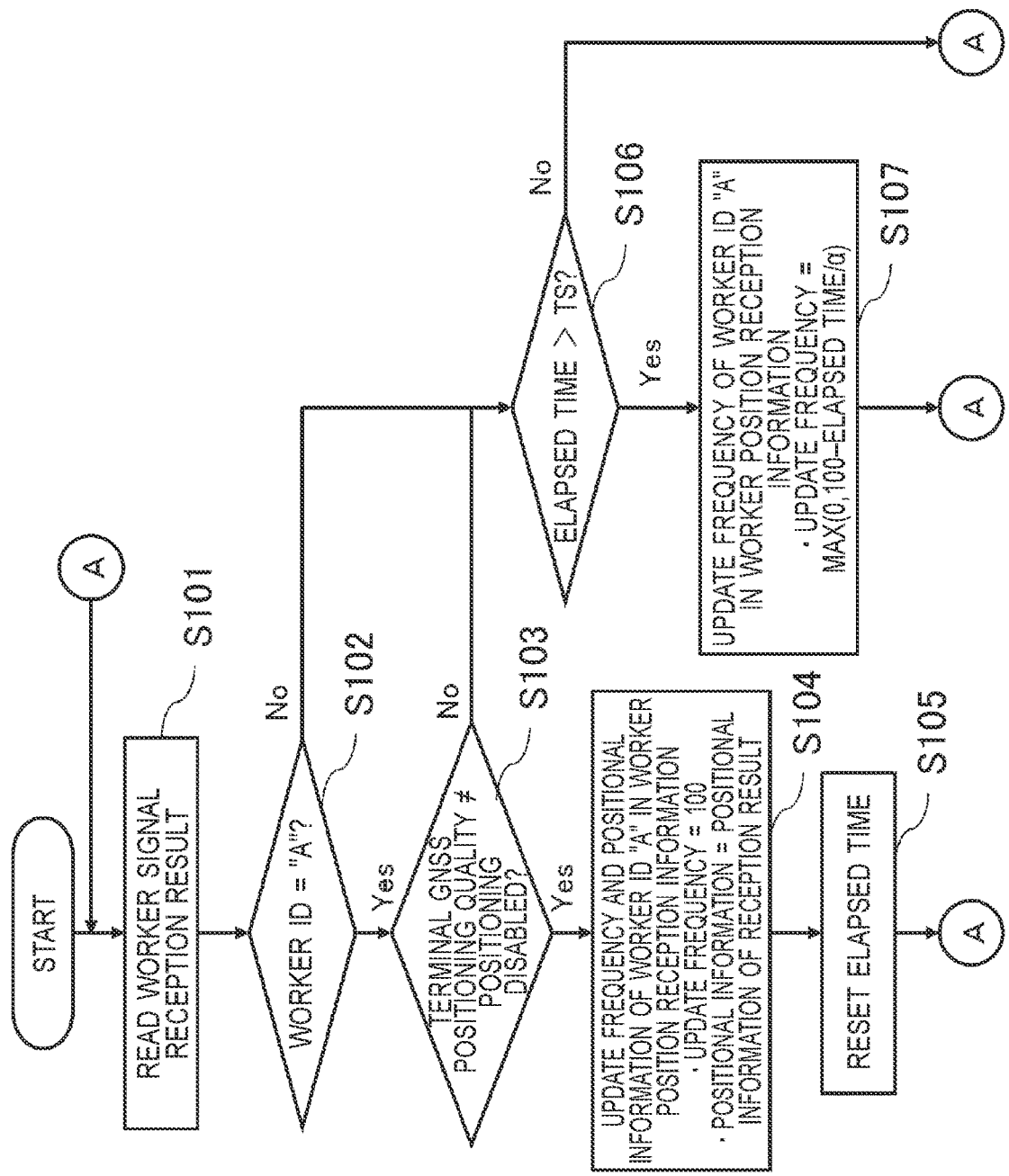
FIG. 11 illustrates a flowchart of worker signal conversion processing in a site management control device according to the present embodiment.
Figure 12:
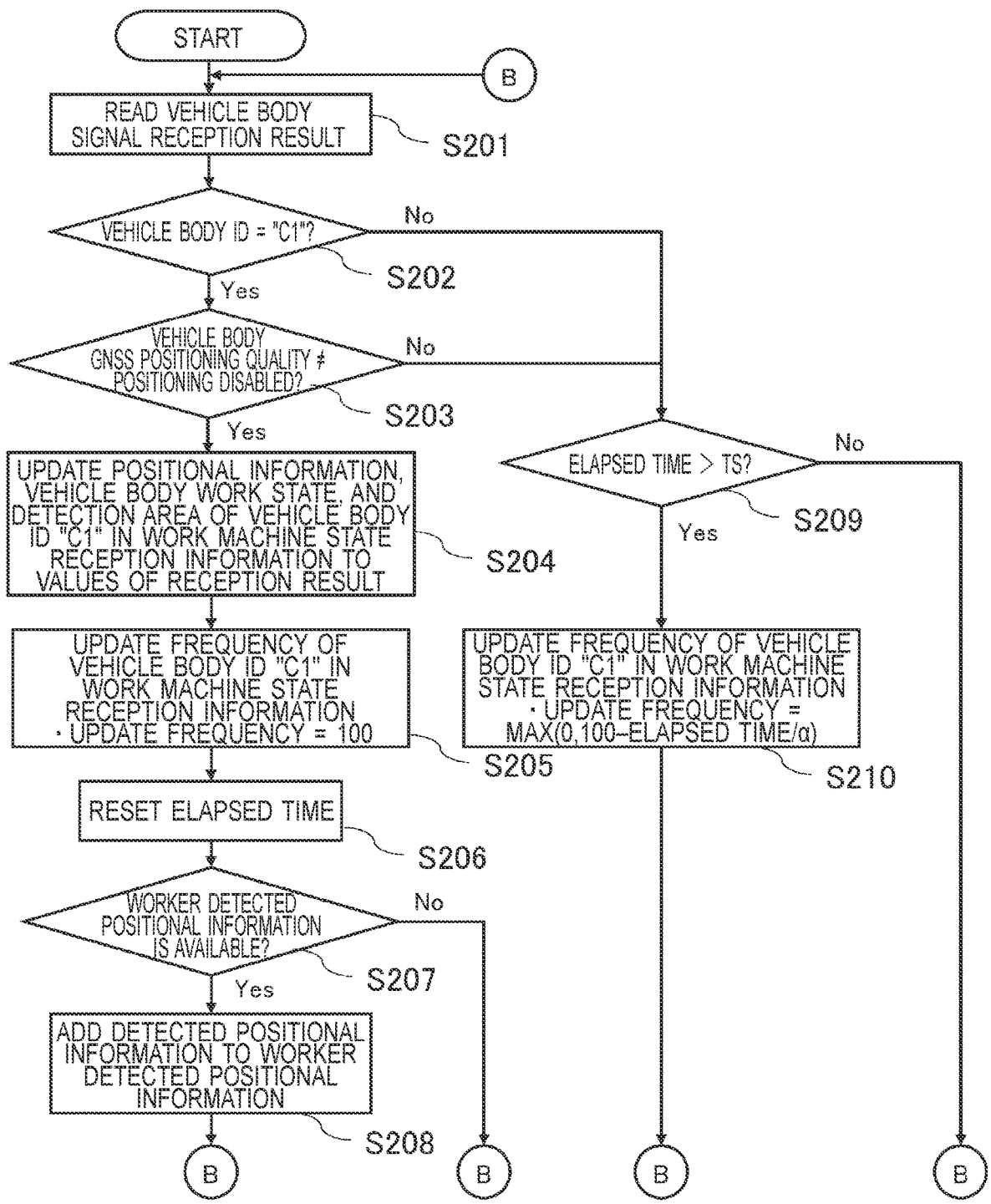
FIG. 12 illustrates a flowchart of vehicle body signal conversion processing in a site management control device according to the present embodiment.
Figure 13:
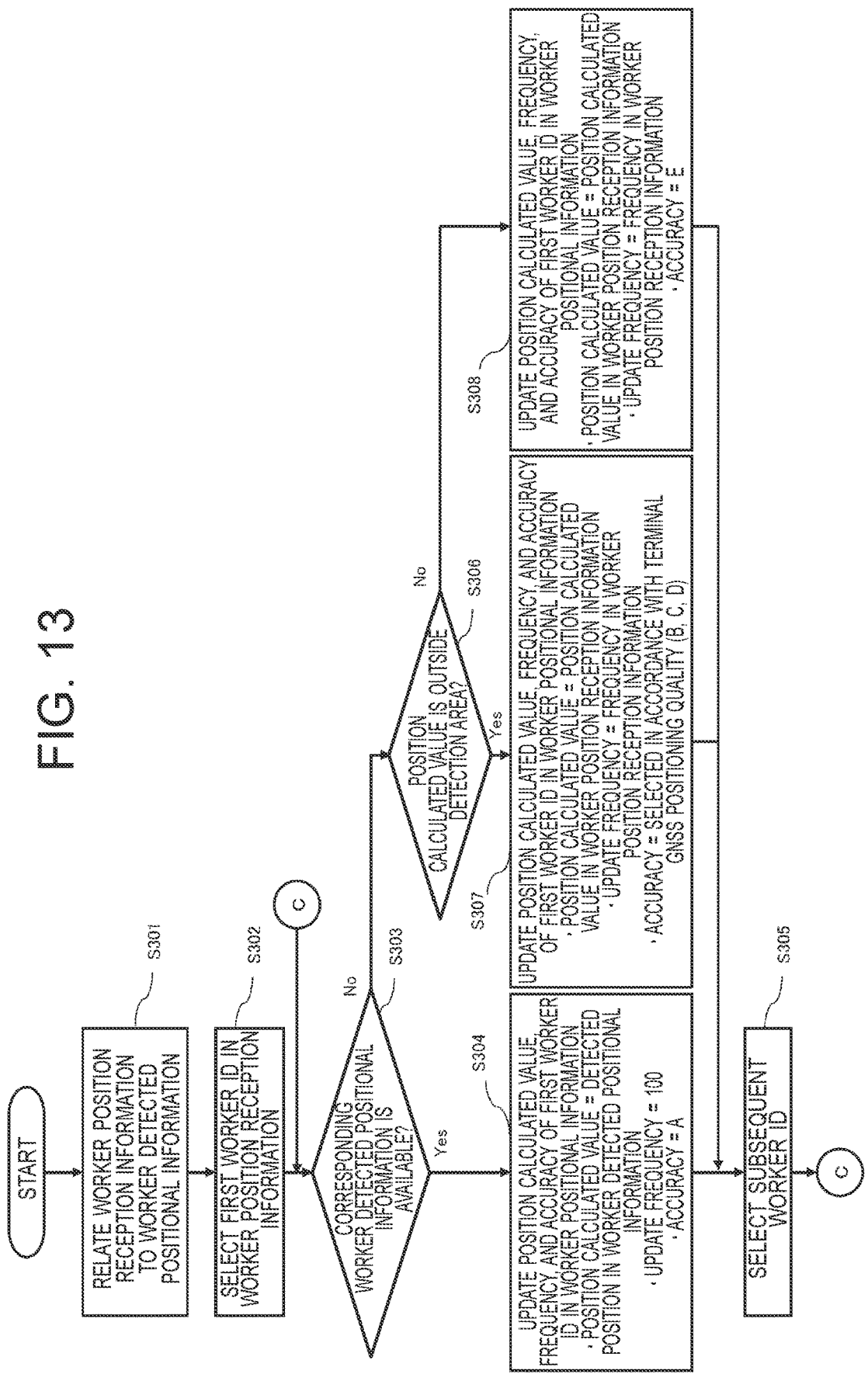
FIG. 13 illustrates a flowchart of worker position evaluation processing in a site management control device according to the present embodiment.

Next, with reference to FIG. 2 and FIGS. 11 to 13, the site management device 30 will be described. FIG. 11 illustrates a flowchart of worker signal conversion processing in the site management control device according to the present embodiment. FIG. 12 illustrates a flowchart of vehicle body signal conversion processing in the site management control device according to the present embodiment. FIG. 13 illustrates a flowchart of worker position evaluation processing in the site management control device according to the present embodiment.

As illustrated in FIG. 2, the site management control device 31 includes an arithmetic section 31A, a storage section 31B, and a timer 31C.

The storage section 31B holds work machine information 310 and worker information 340. The work machine information 310 is a list of the work machines 1 operated in the worksite, and in the present embodiment, holds a list in which the vehicle body IDs that is specific to each work machine 1, types of the work machines, and information of operators of the work machines 1 are made to correspond to each other.

The timer 31C is used to measure an elapsed time, which will be described later.

The worker information 340 is a list of workers operating in the worksite, and in the present embodiment, holds a list in which the worker IDs that are specific to each worker and the attributes of the workers are made to correspond to each other. Each of the attributes of the workers includes the name of a worker and information for distinguishing the worker from an operator of the work machine 1, an auxiliary worker, a surrounding worker, a supervisor, etc. Each of the attributes of the workers may include information such as the company name to which the worker belongs, years of experience, etc., or may have an index obtained by integrating the information above.

The arithmetic section 31A is configured by a site management communication controller 35, a worker position calculation section 37, a positional information extraction section 38, and a display controller 36. The site management communication controller 35 includes a worker system communication section 35a and a vehicle body system communication section 35b.

The worker system communication section 35a is configured to receive and control signals (including the worker signals 140) from all the terminal devices 40 in the worksite via the wireless communication network 150, and output a reception result to the worker position calculation section 37.

The vehicle body system communication section 35b is configured to receive and control signals (including the vehicle body signals 110) from the worker approach detection systems 10 mounted on each of all the work machines 1 in the worksite via the wireless communication network 150, and output a reception result to the worker position calculation section 37.

The worker position calculation section 37 is configured to calculate the positions of all the work machines 1 and the workers in the site by using the worker signals 140 and the vehicle body signals 110, and the work machine information 310 and the worker information 340 stored in the storage section 31B. The worker position calculation section 37 is configured by a worker signal conversion section 37a, a vehicle body signal conversion section 37b, a worker position evaluation section 37c, and a positional information output section 37d.

The worker signal conversion section 37a is configured to generate worker position reception information 350 by using a reception result of the worker signal 140 input from the worker system communication section 35a and worker detected positions included in the worker information 340 stored in the storage section 31B. As illustrated in FIG. 14, the worker position reception information 350 is the one in which information such as a position reception value and update frequency is added to each worker ID. The worker signal conversion section 37a generates the worker position reception information 350 for all worker IDs listed in the worker information 340 based on the reception result of the worker signal 140.

The update frequency represents the novelty (freshness) of the positional information. In the present embodiment, the update frequency is represented by numerical values from 0 to 100, and when the worker signal 140 of a certain worker ID is received within a predetermined time, the update frequency is set to 100. On the other hand, when not being received within the predetermined time, the update frequency is lowered in accordance with the elapsed time from the previous reception.

FIG. 11 illustrates a flowchart for generation of worker position reception information in the worker signal conversion section 37a. The flow illustrated in FIG. 11 is for processing relating to a worker whose worker ID is "A". The same processing is performed for all worker IDs listed in the worker information 340.

At the start of the flow illustrated in FIG. 11, the worker signal conversion section 37a starts measurement of a sampling elapsed time (hereinafter referred as "elapsed time") for the worker ID "A". Then, the worker signal conversion section 37a reads the reception result of the worker signal 140 (S101). When the worker ID included in the read worker signal is "A" (S102/Yes), the worker signal conversion section 37a determines whether positioning can be performed with respect to the information of the terminal GNSS positioning quality included in the worker signal 140 read in step S101, that is, whether the information has the quality in which positioning can be performed (S103). When the information has the quality in which positioning can be performed (S103/Yes), the worker signal conversion section 37a updates the frequency of the ID in the worker position reception information 350 to 100, updates the positional information to the positional information of the reception result indicated in step S101 (S104), and resets the elapsed time (S105). Thereafter, the processing returns to step S101.

In a case where the worker ID is not "A" (S102/No), or a case where the information of the terminal GNSS positioning quality has the quality in which positioning cannot be performed (S103/No), when the elapsed time exceeds Ts (update frequency subtraction grace time) (S106/Yes), the worker signal conversion section 37a calculates the update frequency of the ID (worker ID "A" in the example of FIG. 11) in the worker position reception information 350 based on the following equation (1), and updates the frequency (S107). Thereafter, the processing returns to step S101. When the elapsed time is equal to or less than Ts (update frequency subtraction grace time) (S106/No), the processing also returns to step S101. Here, the update frequency subtraction grace time is a grace time until the update frequency is recalculated. For example, assuming that a sampling period of GNSS is 1 time/sec, when it is determined that the update frequency is not rewritten because the radio waves from the GNSS are interrupted in 10th cycle, a value of $\alpha$ is set to 10. As a result, when GNSS radio wave disturbance occurs instantaneously, it is possible to suppress frequent rewriting of the update frequency.

$$\text{Update frequency} = \max(0, 100 - \text{elapsed time}/\alpha) \quad (1)$$

The vehicle body signal conversion section 37b is configured to generate work machine state reception information 360 and worker detected positional information 370 by using the reception result of the vehicle body signal 110 input from the vehicle body system communication section 35b and the work machine information 310 stored in the storage section 31B. As illustrated in FIG. 15, the work machine state reception information 360 is the one in which update frequency, a position reception value, a vehicle body work state, and a worker detection area are added to each vehicle body ID. The vehicle body signal conversion section 37b generates the work machine state reception information 360 for all vehicle body IDs listed in the work machine information 310 based on the reception result of the vehicle body signal 110.

As illustrated in FIG. 16, the worker detected positional information 370 is obtained by listing the detected positional information of workers detected by the worker approach detection systems 10 mounted on the work machines 1, and includes the detected positional information and the vehicle body ID of the work machines 1 on which the detected worker approach detection systems 10 are mounted.

FIG. 12 illustrates a flowchart for generation of the work machine state reception information 360 and the worker detected positional information 370 in the vehicle body signal conversion section 37b. The update frequency stored in the work machine state reception information 360 represents the novelty of the positional information, and in the present embodiment, is represented by numerical values of 0 to 100. When the vehicle body signal 110 of the vehicle body ID is received within a predetermined time, the update frequency is set to 100, and when the signal is not received within the predetermined time, the update frequency is subtracted in accordance with the elapsed time from the previous reception. The flow illustrated in FIG. 12 is for processing relating to a work machine of which the vehicle body ID is "C1". The same processing is performed for all vehicle body IDs listed in the work machine information 310.

At the start of the flow illustrated in FIG. 12, the vehicle body signal conversion section 37b starts measurement of a sampling elapsed time (hereinafter referred to as "elapsed time") for the vehicle body ID "C1". Then, the vehicle body signal conversion section 37b reads the reception result of the vehicle body signal 110 (S201). When the vehicle body ID included in the read vehicle body signal 110 is "C1" (S202/Yes), the vehicle body signal conversion section 37b determines whether positioning can be performed with respect to the information of the vehicle body GNSS positioning quality included in the vehicle body signal 110 read in step S201, that is, whether the information has the quality in which positioning can be performed (S203). When the information has the quality in which positioning can be performed (S203/Yes), the vehicle body signal conversion section 37b updates the positional information of the vehicle ID "C1", the vehicle body work state thereof, and the detection area 220 thereof, which are listed in the work machine state reception information 360, to the values of the reception result indicated in step S201 (S204), updates the update frequency of the ID "C1" in the work machine state reception information 360 to 100 (S205), and resets the elapsed time (S206).

When the worker detected positional information 370 is available (S207/Yes), the vehicle body signal conversion section 37b adds, to the worker detected positional information 370, the detected positional information of the sensor coordinate system from the surrounding monitoring sensor 20 (S208), and the processing returns to step S201.

In a case where the vehicle body ID is not "C1" (S202/No), or a case where the information of the vehicle body GNSS positioning quality has the quality in which positioning cannot be performed (S203/No), when the elapsed time exceeds Ts (S209/Yes), the vehicle body signal conversion section 37b calculates the update frequency of the ID "C1" in the working machine state reception information 360 based on the Equation (1), and updates the frequency (S210). Thereafter, the processing returns to step S201. Also in a case where the worker detected positional information 370 is not available (S207/No) and a case where the elapsed time is equal to or less than Ts (S209/No), the processing returns to step S201.

The worker position evaluation section 37c is configured to generate worker positional information 380 illustrated in FIG. 17 by using the worker position reception information 350 generated by the worker signal conversion section 37a, and the work machine state reception information 360 and the worker detected positional information 370 generated by the vehicle body signal conversion section 37b.

As illustrated in FIG. 17, the worker positional information 380 includes worker IDs, position calculated values, update frequency, and accuracy. The worker position evaluation section 37c receives two types of information, namely, the worker position reception information 350 and the worker detected positional information 370, as the information relating to a position of a worker. The worker position reception information 350 and the worker detected positional information 370 have characteristic as described below.

The worker position reception information 350 has the information of the worker IDs while the worker detected positional information 370 does not have the information of the worker IDs. The positional information of the workers included in the worker position reception information 350 is the position calculated in the terminal device 40 by using the terminal GNSS device 45 while the positional information of the workers included in the worker detected positional information 370 is the position detected by the worker approach detection system 10.

Generally, since the positional information output from the worker approach detection system 10 is more accurate than the positional information calculated in the terminal device 40 by using the terminal GNSS device 45, it is considered that the positional information of the workers included in the worker detected positional information 370 is more accurate.

The worker position evaluation section 37c is configured to perform integration processing of the worker position reception information 350 and the worker detected positional information 370, and evaluate the positional information so as to generate worker positional information 380. Various methods can be applied to the integration processing, and in the following, one of the examples of the integration processing will be described to explain the worker positional information generation processing.

FIG. 13 illustrates a flowchart for generation of the worker positional information 380 in the worker position evaluation section 37c. Firstly, the worker position evaluation section 37c relates the information included in the worker position reception information 350 to the information included in the worker detected positional information 370, both of which are the information for the same worker (S301). The processing above is performed based on the separation degree among all the worker detected positions included in the worker position reception information 350 and the worker detected positional information 370 by using, for example, Global Nearest Neighbor method. In the subsequent processing, when both the worker signal 140 and the worker detected positional information with respect to the same worker are available, the position indicated by the worker detected positional information is selected as a current position of the worker. On the other hand, when only the worker signal 140 is available, the terminal current position is selected as the current position of the worker.

Next, the worker position evaluation section 37c selects the first worker ID among the worker IDs included in the worker position reception information 350 (S302), and when the worker detected positional information 370 corresponding to the first worker ID is available (S303/Yes), the worker position evaluation section 37c updates the position calculated value, the update frequency, and the accuracy in accordance with whether it is related to the worker detected positional information 370, whether it is related to the detection area 220 included in the work machine state reception information 360, and the terminal GNSS positioning quality (S304).

The accuracy represents the accuracy of the positional information, and in the present embodiment, it is represented by five levels "A" to "E". In step S304, the position calculated value is updated to the detected position in the worker detected positional information 370, the update frequency is updated to 100, and the accuracy is updated to "A".

The worker position evaluation section 37c selects the subsequent worker ID (S305), and performs the processing of step S303 and thereafter.

In a case where the worker detected positional information 370 corresponding to the first worker ID selected among the worker IDs in step S302 is not available (S303/No), and when the position calculated value of the first worker ID is outside the detection area of the surrounding monitoring sensor 20 (S306/Yes), the position calculated value of the first worker ID in the worker positional information 380 is updated to the position calculated value of the worker position reception information 350, the update frequency thereof is updated to the update frequency of the worker position reception information 350, and the accuracy thereof is updated to one of "B", "C", and "D" which is selected in accordance with the terminal GNSS positioning quality (S307). Then, the processing proceeds to step S305. Here, among the positional information of the workers included in the worker detected positional information 370, the information that is not related to any worker IDs is stored in the worker positional information 380 as the worker ID="unknown", the update frequency=100, and the accuracy="B". Then, the processing proceeds to step S305.

In step S306, when the position calculated value is within the detection area of the surrounding monitoring sensor 20 (S306/No), the position calculated value of the first worker ID in the worker positional information 380 is updated to the position calculated value in the worker position reception information 350, the update frequency thereof is updated to the update frequency in the worker position reception information 350, and the accuracy thereof is updated to "E" (S308). Then, the processing proceeds to step S305.

The positional information output section 37d is configured to output, to the positional information extraction section 38 and the site information storage device 32, the worker positional information 380 generated by the worker position evaluation section 37c and the work machine state reception information 360 generated by the vehicle body signal conversion section 37b, as work machine and worker positional information representing the positions of the work machine and the worker.

In response to input from the setting input device 34, the positional information extraction section 38 refers to the work machine and worker positional information output from the worker position calculation section 37 and the past work machine and worker positional information stored in the site information storage device 32, and extracts information to be output to the site management display device 33. For example, when an area to be displayed on the site management display device 33 is designated by the setting input device 34, the positional information extraction section 38 extracts information of the work machine 1 and a worker present in the designated area among the work machine and worker positional information output from the worker position calculation section 37, and outputs a display command to the site management display device 33.

The site information storage device 32 includes a recording medium such as a semiconductor memory and a magnetic recording medium, and is configured to record and accumulate the work machine and worker positional information output from the worker position calculation section 37. Furthermore, in response to a command from the positional information extraction section 38, the site information storage device 32 outputs the stored past work machine and worker positional information to the display controller 36.

Figure 18:
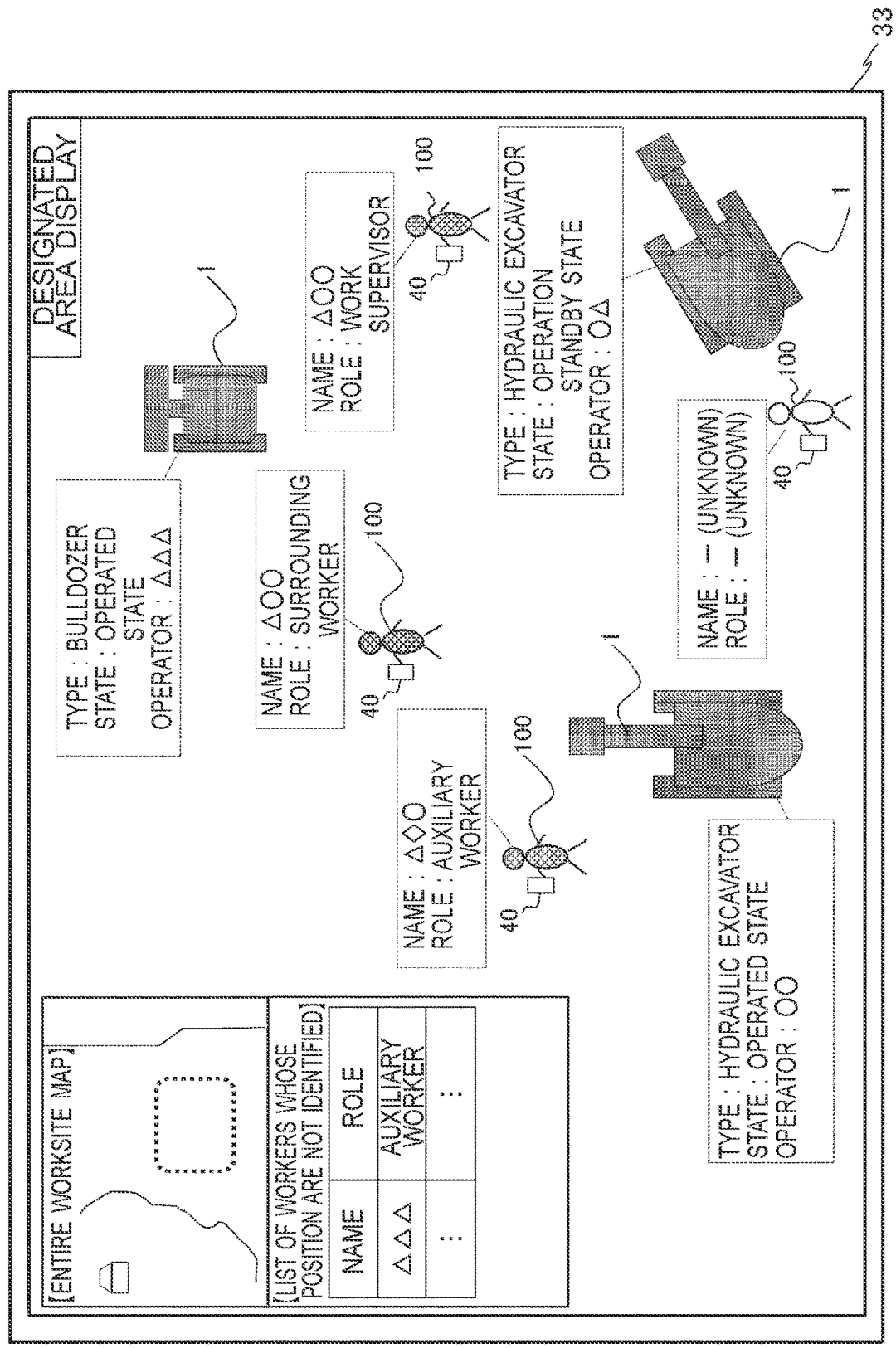
FIG. 18 illustrates an example of display on a site management display device.

The site management display device 33 is configured to display information of the work machines 1 and the workers in the worksite based on the display command from the display controller 36. FIG. 18 illustrates an example of the display on the site management display device 33. In the example of FIG. 18, the arrangement and the work states of the work machines 1 and the workers in the designated area within the worksite are displayed in real time. Based on the positional information of the work machines 1 and the workers present in the area designated by the setting input device 34, the work machines and the workers are drawn on the top view of the designated area. In addition, in the example of FIG. 18, as information relating to the work machines 1, the types of the work machines, the work states, and the names of the operators in charge are displayed while as information relating to the workers, the names and roles of the workers are displayed. In this connection, a worker whose position calculated value in the worker positional information 380 is "N/A" may be regarded as a worker whose position is not identified, and may be displayed on a list of workers whose positions are not identified. In addition, as a simple display of the work history, a display of the movement trajectories of the work machines 1 and the workers in a predetermined period may be added.

According to the present embodiment, the terminal device 40 carried by a worker is configured to relate a terminal GNSS position to a worker detected position, and when the worker detected position is available, the detected position of the worker detected position is selected as a current position of the worker. On the other hand, when the terminal GNSS position cannot be related to the worker detected position, the terminal GNSS position is selected as the current position of the worker. As a result, when a worker is present near a work machine, it is possible to select a worker detected position which is more accurate than a terminal GNSS position of which degradation in the positioning quality is concerned.

In addition, although the surrounding monitoring sensor 20 can detect the presence of an object to be detected located around the work machine 1, it is difficult to specifically identify the object to be detected nor obtain the attribute information of the detected worker, on the other hand, according to the present embodiment, it is possible to obtain the attribute information of the worker.

The embodiment described above indicates one aspect of the present invention, and variations which do not depart from the technical concept of the present invention are included in the present invention.

For example, the work machine 1 is not limited to a hydraulic excavator. Meanwhile, a work machine such as a bulldozer or a wheel loader may be used.

Furthermore, as processing for considering a position error due to a GNSS, in a case where the position calculation error estimated value is not output, the worker signal conversion section 37a or the vehicle body signal conversion section 37b may be configured to refer to position calculation error information held in the storage section 60B, derive the position calculation error estimated value, and store the position calculation error estimated value instead of the GNSS positioning quality information.

Still further, when updating the worker positional information, the worker position evaluation section 37c may refer to the position calculation error information held in the storage section 60B, derive the position calculation error estimated value, and calculate the accuracy based on the position calculation error estimated value.

REFERENCE SIGNS LIST 1 work machine
10 worker approach detection system
20 surrounding monitoring sensor
30 site management device
31 site management control device
33 site management display device
34 setting input device
35 site management communication controller
36 display controller
39 site management wireless communication device
40 terminal device
43 terminal wireless communication device
45 terminal GNSS device
60 vehicle body control device
80 notification device
81 display device
82 warning device
92 vehicle body wireless communication device
110 vehicle body signal
140 worker signal
150 wireless communication network
200 worker management system

The invention claimed is:

1. A worker management system comprising:
a terminal device carried by a worker;
a worker detection system mounted on a work machine; and
a site management device connected to each of the terminal device and the worker detection system via a wireless communication network,
wherein
the terminal device includes:
  a terminal GNSS device configured to receive a GNSS positioning signal to generate terminal GNSS positional information; and
  a terminal wireless communication device connected to the wireless communication network,
the terminal device is configured to transmit a worker signal, which includes the terminal GNSS positional information and worker identification information for identifying the worker, to the site management device via the terminal wireless communication device,
the worker detection system includes:
  a vehicle body GNSS device configured to receive a GNSS positioning signal to generate vehicle body GNSS positional information;
  a surrounding monitoring sensor configured to detect an object located near the work machine;
  a vehicle body wireless communication device connected to the wireless communication network; and
  a vehicle body control device connected to each of the vehicle body GNSS device, the surrounding monitoring sensor, and the vehicle body wireless communication device,
the vehicle body control device is configured to generate a vehicle body signal which includes the vehicle body GNSS positional information, worker detected positional information indicating a position of the worker detected by the surroundings monitoring sensor, and a work machine identification signal for identifying the work machine, and transmit the vehicle body signal via the vehicle body wireless communication device to the site management device,
the site management device includes:
  a site management communication device connected to the wireless communication network;
  a display device; and
  a site management control device connected to each of the site management communication device and the display device, the site management control device is configured to acquire the worker signal and the vehicle body signal which are received by the site management communication device, calculate a current position of the worker by using the terminal GNSS positional information included in the worker signal and the worker detected positional information included in the vehicle body signal, and generate and output a display command to the display device, and the display device is configured to perform display in accordance with the display command.

2. The worker management system according to claim 1, wherein the site management control device is configured to:
relate the terminal GNSS positional information included in the worker signal to the worker detected positional information included in the vehicle body signal based on a degree of separation between positions,
when both the terminal GNSS positional information and the worker detected positional information are available with respect to a same worker, select a position indicated by the worker detected positional information as the current position of the worker, and
when only the terminal GNSS positional information is available, select a position indicated by the terminal GNSS positional information as the current position of the worker.

3. The worker management system according to claim 1, wherein the site management control device is configured to:
further include a timer for measuring an elapsed time from reception of the worker signal; and
decrease accuracy of the current position of the worker based on the elapsed time from the receipt of the worker signal.

4. The worker management system according to claim 1, wherein the vehicle body control device is configured to acquire, from the work machine, work machine state information indicating a work state of the work machine to generate the vehicle body signal including the work machine state information, and
the site management control device is configured to generate the display command including a position of the work machine and the work state of the work machine based on the vehicle body signal.

5. The worker management system according to claim 1, wherein the site management device is configured to:
further include a setting input device configured to receive operation for setting a specific area in a worksite, and
extract positional information of the worker present in the specific area which has been input by the setting input device to generate the display command for displaying an extracted position of the worker.

6. The worker management system according to claim 5, wherein the site management control device is configured to extract a worker ID having the terminal GNSS positional information in which positioning cannot be performed, generate a list of workers having the terminal GNSS positional information in which positioning cannot be performed, and generate the display command for displaying the list of workers having the terminal GNSS positional information in which positioning cannot be performed.

* * * * *